Figure 1:
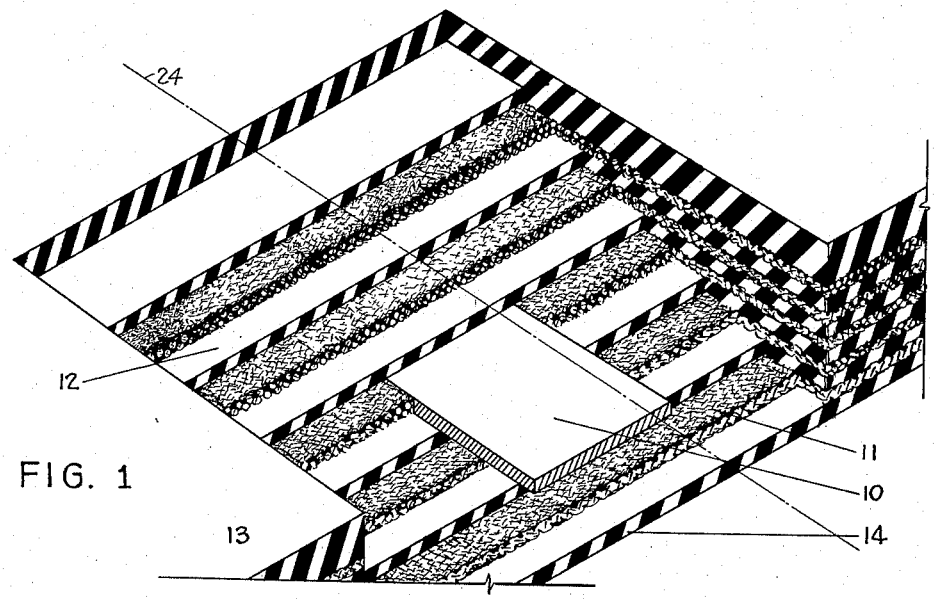

April 20, 1965  A. F. KAIN  3,179,240
BELT CONVEYOR AND MAGNETIC TRAINING MEANS
Original Filed Feb. 19, 1962

INVENTOR.
ARTHUR F. KAIN
BY A. T. Sperry

3,179,240
BELT CONVEYOR AND MAGNETIC TRAINING MEANS
Arthur F. Kain, Mulberry, Fla.
Original application Feb. 19, 1962, Ser. No. 174,145. Divided and this application Oct. 22, 1963, Ser. No. 318,121
2 Claims. (Cl. 198—202)

This is a division of my now abandoned application entitled Training Methods and Means, Serial No. 174,145, filed February 19, 1962, and is filed in response to a requirement for restriction thereof.

This invention relates to methods of and means for magnetically training moving elements in predetermined patterns of travel. While many aspects of the present inventive concept, and certain structural embodiments thereof, as here illustrated and described, may be generally applicable in guiding a wide variety of elements in a predetermined path of travel, the invention in one preferred application, here chosen as a specific illustration of the concept, is used in the training of troughed or flat conveyor belts as used in the transportation of loose aggregate, bulk or packaged material.

In many conveyor systems, and particularly those of extended conveying flights and where such flights are supported to form a catenary, it has long since been common practice to provide training guides, spools or rollers at the edges of the conveyor belt and in suitably spaced relation to maintain the belt in a straight flight or even in some instances, to impose deviations from a straight flight for specific purposes. In some instances such belt contacting guides or rollers may be used to impose the desired troughing of the belt. The use of such devices which frictionally engage the belt as it moves in its path of travel obviously produces wear, deterioration, and damage to edges of the belt which in the course of time must be repaired or replaced.

In one preferred embodiment of the present invention, a conveyor belt is provided with an internal central longitudinal flat strip of magnetic responsive material, such as steel or iron. The strip of course is flexible. Below the material carrying upper flight of the belt there is arranged a magnetic flux producing fixed element such as permanent or electro magnets. Such magnets are preferably of substantially the same width as the magnetically responsive strip of the belt. By the arrangement of the magnets in the preferred path of travel of the belt, magnetic flux passes from the magnets through the magnetic conductor of the upper belt, thus its flight will be restrained to travel in the predetermined path determined by the positions of the magnets. As presently conceived, elongate magnetic fields will be induced by magnet bars arranged between the conventional training rollers for the upper belt flight. Similar magnets are also to be arranged between the conveying flight and the return flight adjacent the return flight to train such return flight in the manner stated. Where such conveyor and return flights are closely spaced, a single series of magnets may perform training effects on both flights.

In another form of the invention individual particulate magnetic material is used in place of the strip referred to above, such as iron filings or iron powder or the like, to constitute a preferably continuous central band or strip responsive to a magnet located as described. In still another form of the invention a magnetic wheel is located between the conveyor flights and with opposite outer peripheries in contact with the opposite flights. The peripheral speed of the wheel is equal to the lineal speed of travel of the belt flights and hence though direct contact of magnet and wheel is established friction, if any, will be negligible.

Figure 2:
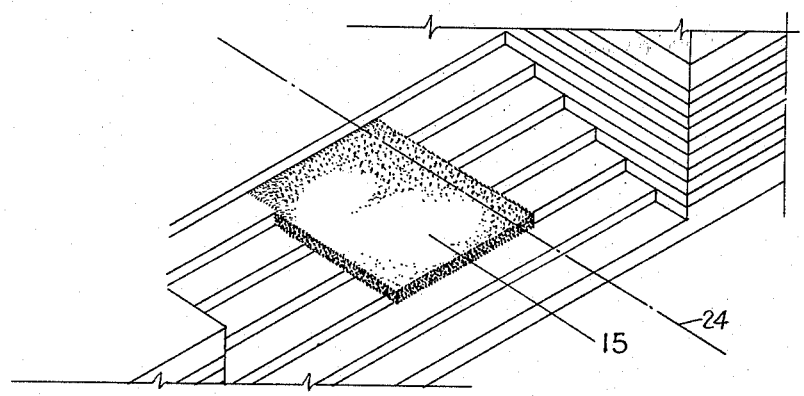
Figure 3:
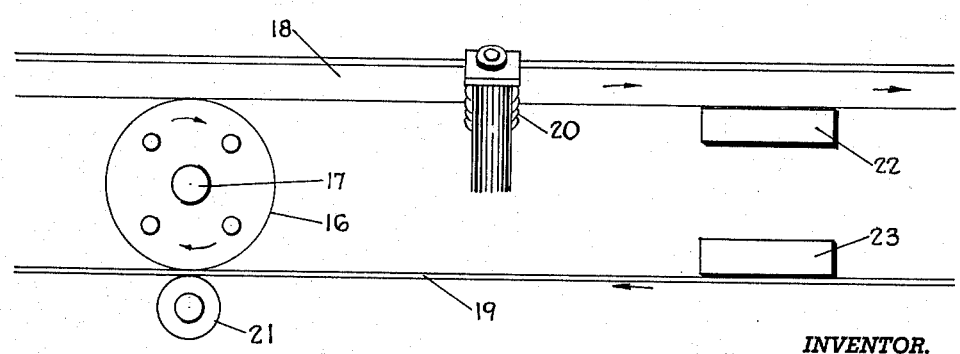

From the foregoing, it will be seen that it is among the primary objects of the present invention to provide a novel and improved means for the training of moving members, particularly such as conveyor belts, to restrain such belts to a predetermined path of travel. More specifically, it is an object of the present invention to provide a training means devoid of any objectionable frictional contact with the belt and hence to obviate deterioration through frictional contact of the training member with the moving belt. It is a further object of the invention to carry out the foregoing object by the use of magnetic responsive means by a restraining influence applied to the belt for maintaining a predetermined path of travel without physical contact with any other training devices. In the present illustrative presentation of one application of the invention, it is an object to provide a training means for conveyor belts operable through the magnetic reaction of means carried by the belt and stationary means in the desired path of travel, whereby the magnetic responses will maintain the belt in a predetermined path of travel as determined by the stationary magnetic responsive elements. Numerous other objects, features and advantages of the present inventive concept will be apparent from a consideration of the following specification, taken in conjunction with the accompanying drawings, in which:

FIG. 1 is a fragmentary perspective view showing a section through the belt to illustrate the magnetically responsive solid metal strip and one preferred embodiment of its incorporation in a belt, FIG. 2 is a fragmentary view showing a section of a belt utilizing a magnetically responsive strip of iron filings, and FIG. 3 is a perspective view of a conveyor belt arrangement where training is provided by a magnetic wheel and/or fixed magnets.

Throughout the present specification and claims the term "magnetically responsive" has been used to indicate elements combining to produce one or more partially closed fields of closed magnetic flux whereby magnetic influence is exerted to restrain a moving object containing one of said magnetically responsive means in a path of travel determined by the companion magnetically responsive means. It will be understood, of course, that in the practice of the invention, either the fixed or moving magnetically responsive means may be the magnet or the iron inert flux conveying member. In the illustration here presented, the inert flux conducting means, such as magnetically responsive solid metal strips or particulate iron material, is carried by the belt while the magnetic inducing means may be in the form of one or more permanent magnets or electro magnets, either stationary or rotating. It is to be noted, however, that in the various applications of the inventive concept, the magnetic elements may be reversed with the flux producing means being in the movable element while the fixed elements is the inert flux conductor member or members. Also, the type arrangement, size and configuration of either the moving or fixed magnetic responsive means may be widely varied to meet the various conditions with respect to which the invention is applied. Of course, it will be understood that the invention is in no way limited to the specific illustrative structural details, arrangements or types of electro responsive means and their suggested method of inclusion or attachment to either the moving member or the fixed element.

Referring now more particularly to FIGURE 2 of the drawings, a conveyor belt is shown including a transversely central thin flat strip of flexible ferrous material 10. It will be understood that such belts are continuous belts, the upper flight constituting the material conveying surface, or trough, while the lower flight is a return flight usually flat. In this form of the invention the ferrous magnetic flux conducting strip 10 is a continuous strip throughout the continuous length of the belt. As in conventional practice, the belt is here shown as formed of successive cord or fabric plies 11 spaced by intermediate friction rubber, indicated at 12, vulcanized between the plies and forming a relatively thick wear resistant upper load supporting surface 13. The lower pulley and roller contacting surface 14 is substantially thinner than the thick upper rubber surface 13 and hence though the strip 10 is located in the plane of the central fabric ply, which is cut away at the center of the belt to receive the strip, the strip is located nearer the inner face of the belt to enhance its magnetic flux conducting capacity with respect to a magnet. (Not shown in FIGURE 2 but indicated at 22 and 23 in FIGURE 3.)

With respect to the construction of the belt carcass here presented by way of illustration, it will be understood that the invention is in no way limited or confined to such construction. The essence of the invention in-so-far as the belt is concerned, lies in the provision of magnetically responsive means associated with and traveling with a belt regardless of whether it be embedded between fabric and rubber plies as shown in FIGURE 2, or otherwise attached and secured in magnetic flux conducting relation to fixed magnetic means located in a predetermined desired path of travel of the belt. While FIGURE 1 discloses a single central band 10, plural spaced strips responsive to plural spaced magnets may be employed and in certain instances the magnets may be located otherwise than in directly below the inner face of the belt.

As indicated in FIGURE 2, there may be substituted for the integral ferrous band 10, particulate ferrous material such as iron filing 15 or granular flux conducting material of a like magnetic nature. As here shown, the particulate magnetic responsive material is located in the manner of the band 10, longitudinally and transversely centrally of the belt. However, the invention is not so limited, such flux conducting material may be otherwise dispensed throughout the belt carcass or may be adhesively secured to the belt surface.

In FIGURE 3 there is disclosed two types of magnet arrangements for belts having incorporated therewith magnetically responsive means, as for instance the belts of FIGURES 1 or 2. At the left there is shown a rotatable magnetic wheel 16 rotatable on its axis 17. The rim of the wheel 16 may enclose a stationary magnet with vertical poles or may be formed from arcuate magnetic segments. The use of a plurality of such wheels between extended flights of belts is contemplated. The wheel 16 is preferably of such diameter and is so located that its upper surface contacts the central lower surface of the carrying flight 18 of the conveyor. Frictional engagement of such top surface of the wheel 16 with the belt flight 18 as its moves to the right, as indicated by the arrows, will induce a clockwise rotation of the wheel, as indicated by its arrow. Since movement of the belt induces rotation of the wheel the surface speed of the wheel's rotation will equal the lineal speed of the belt and hence wear and friction between belt and wheel will be negligible. The lower surface of the wheel similarly contacts the upper surface of the return flight 19, whereby a like turning movement is provided for the lower surface of the wheel and in like manner friction is negligible. As in conventional manner a troughing roller, indicated at 20, is provided for the upper material conveying flight 18 and a training roller 21 is provided for contact with the outer face of the return flight 19 to maintain contact of such return flight with the lower surface of the wheel 16.

To the right of the troughing roller 20 of FIGURE 3 there is shown an upper and lower pair of bar magnets 22 and 23 respectively. Such bar magnets, as is the wheel 16, are located in such manner as to define the path of travel of the belt and preventing belt deflection under the influence of load irregularities or maladjustment of training rollers, idlers, return rollers, or the like. For use with belts, as shown in FIGURES 1 and 2 the magnets are of course located centrally of the preferred path of travel and set up a magnetic flux passing through the flux conducting strip to attract the belt, precluding its departure from the predetermined path established by the magnets. In practice the bar magnets 22 and 23 may be several feet in length and located between successive troughing rollers 20, and in some instances extending the full distance between such rollers. To insure maximum efficiency of the magnets they may preferably contact the inner faces of the belt flights and in such case a "Teflon" or the like surface on the conducting face of the magnets may be used to provide substantially frictionless contact.

From the foregoing, it will be seen that the present invention provides novel and improved effective, efficient and economical means and method for constraining a moving object to movement in a predetermined pattern. The inventive concept is particularly adapted for the training and guidance of conveyor belts without requiring wear inducing physical contact thereof with guide rollers or the like. In its present embodiment the invention provides a novel conveyor belt with an enclosed magnetic responsive means in the form of a strip of magnetic flux conducting material responsive to relatively fixed magnetic means such as elongated magnets located adjacent the inner faces of the belt flight or a rotary magnet with the surface of which preferably moves at the same speed as the lineal speed of the inner faces of the flight with which it contacts to induce its rotation. It will, of course be understood that the invention is in no way limited nor confined to the specific belt structure here illustrated, nor to the type or location of the magnetic responsive means of the belt or of the magnet. Thus in the practice of the invention numerous changes, modifications, and the full use of equivalents may be resorted to without departure from the spirit or scope of the appended claims.

What I claim is:

1. A conveyor comprising an elongated, continuous conveyor belt of appreciable thickness, means for supporting the belt in its travel, said belt being unconfined along its side edges allowing for a tendency to shift laterally unless controlled, said belt being of fabric and rubber plies, being of substantial width and having incorporated therein, centrally of its width, a longitudinally extending flexible strip of magnetically responsive material of substantially less width than that of the belt, a magnet means of a narrow width comparable to that of the flexible strip fixedly supported independently of the belt in a position centrally and closely below the under surface of the belt in alignment with the path of the strip of magnetically responsive material, whereby, during travel of the belt, said strip will be constrained to travel in predetermined relation to the magnet means through its magnetic field, thereby resisting forces tending to cause the belt to deviate from a fixed path of travel.

2. A conveyor comprising an elongated, continuous conveyor belt of appreciable thickness, means for supporting the belt in its travel, said belt being unconfined along its side edges allowing for a tendency to shift laterally unless controlled, said belt being of fabric and rubber plies, being of substantial width and having incorporated therein, centrally of its width, a longitudinally extending flexible strip of magnetically responsive material of substantially less width than that of the belt, a magnetic supporting wheel held in fixed position to rotate on an axis extending at right angles to the longitudinal dimension of the belt, said wheel having a narrow magnetic tread of a width comparable to the width of the narrow strip of magnetically responsive material, the periphery of the wheel being in central, supporting relation to the belt and aligned symmetrically with said strip, whereby, during travel of the belt, said strip will be constrained to travel in predetermined relation to the magnetic wheel through its magnetic field, thereby resisting forces tending to cause the belt to deviate from a fixed path of travel.

References Cited by the Examiner

UNITED STATES PATENTS

| | | | |
|---|---|---|---|
| 2,684,753 | 7/54 | Kolbe et al. | 198—41 X |
| 2,748,044 | 5/56 | Seiler | 74—237 X |
| 2,881,901 | 4/59 | Zimmer | 198—41 |

FOREIGN PATENTS

| | | |
|---|---|---|
| 738,463 | 10/55 | Great Britain. |

DON A. WAITE, *Primary Examiner.*